April 2, 1963

R. J. CORONADO ET AL 3,083,960

CARD HANDLING APPARATUS

Filed Dec. 30, 1960

6 Sheets-Sheet 1

Robert J. Coronado,
Jack Y. Yamashiro,
Samuel C. Ward,
INVENTORS.
BY.
[signature]
AGENT.

April 2, 1963 R. J. CORONADO ET AL 3,083,960

CARD HANDLING APPARATUS

Filed Dec. 30, 1960

6 Sheets-Sheet 2

Robert J. Coronado,
Jack Y. Yamashiro,
Samuel C. Ward,
INVENTORS,
BY.
Ernest F. Oberheim
AGENT.

April 2, 1963 R. J. CORONADO ET AL 3,083,960

CARD HANDLING APPARATUS

Filed Dec. 30, 1960 6 Sheets-Sheet 3

Robert J. Coronado,
Jack Y. Yamashiro,
Samuel C. Ward,
*INVENTORS.*
*BY.*

[signature]

*AGENT.*

Robert J. Coronado,
Jack Y. Yamashiro,
Samuel C. Ward,
*INVENTORS.*
*BY.*
Samuel L. Olken
*AGENT*

Robert J. Coronado,
Jack Y. Yamashiro,
Samuel C. Ward,
INVENTORS.
BY.
Ernest L. Olecken
AGENT.

April 2, 1963 R. J. CORONADO ET AL 3,083,960

CARD HANDLING APPARATUS

Filed Dec. 30, 1960 6 Sheets-Sheet 6

Robert J Coronado,
Jack Y. Yamashiro,
Samuel C. Ward,
*INVENTORS.*
*BY.*

Ernest F. Oberlin

*AGENT.*

United States Patent Office 3,083,960

Patented Apr. 2, 1963

3,083,960

CARD HANDLING APPARATUS

Robert J. Coronado, Manhattan Beach, Jack Y. Yamashiro, Gardena, and Samuel C. Ward, Los Angeles, Calif., assignors to Hughes Aircraft Company, Culver City, Calif., a corporation of Delaware Filed Dec. 30, 1960, Ser. No. 79,879

12 Claims. (Cl. 271—4)

This invention relates generally to an apparatus or device for handling individual information carriers. More particularly, this invention relates to an apparatus or device which upon command submits a particular information carrier for reading, or viewing, or other purpose.

Techniques have been developed for providing reduced size records of printed pages or drawings on film strips. Such film strips are usually mounted on reels in a particular type of viewing apparatus wherein the film strip is transported between the two reels and stopped at desired frames so that the subject matter of the frame may be viewed by means of a suitable optical system. Arrangements of this type are conveniently set up since transport mechanisms for handling film strips or tapes are well known and there is no problem in maintaining information on the tape in a particular position on the tape.

The application of such information recording techniques to individual information carriers, such as cards, presents some additional problems. One of the problems is that of maintaining the cards properly oriented so that they are returned to the stack in the same orientation they were in at removal. Provision for maintaining card orientation must be made if the system is to function properly.

Rapid access to the cards is another feature which is desired. Manual handling of the cards, of course, does not provide rapid access. Additionally, any semiautomatic system which does not provide for selection of the card and return of the card to the file is undesirable since again speed is materially impaired if manual operations are interposed between the removal and return of the card to the card file.

It is additionally desirable to provide a completely automatic type of apparatus for handling individual information carriers, such as cards, so that a single such apparatus or unit may provide information to widely scattered points where information contained in the card file is needed. In particular, such a device should be so organized mechanically and electrically that it may be interrogated from any of the points, however remotely situated, including, for instance, interrogation by telephone.

It is to be understood that the use of the word "card" herein denotes any type of individual information carrier and connotes no meaning as to the type of material from which the "card" is made. For instance, the "card" may be of heavy stiff paper, cardboard, photographic film, metal, etc.

Accordingly, it is one object of this invention to provide an apparatus for handling individual information carriers which is simple with respect to operational requirements and reliable.

Another object of this invention is to provide an arrangement of the character referred to in the preceding object which provides rapid access to a particular information carrier in a stack or magazine of such information carriers.

A specific object of this invention is to provide a card handling and viewing apparatus which is completely automatic.

Another specific object of this invention is to provide a card handling apparatus which removes the cards from a stack or magazine, presents a selected card for viewing, and returns all cards removed from the stack to the stack properly oriented for further cycling and/or viewing.

Further to the preceding object, it is also an object of this invention to provide an apparatus in which there is no need for maintaining the cards in some predetermined order.

It is also an object of this invention to provide an apparatus of the character aforesaid in which facilities are incorporated permitting removal and insertion of cards as desired.

The aforesaid and other objects and advantages are accomplished in a card handling apparatus according to the present invention, including a card transport system having a first transport mechanism which may be started and stopped as required and cooperating with a second card transport mechanism which may be continuously operated. A card stack or a magazine is disposed so that cards may be removed therefrom and inserted into the first transport mechanism and carried thereby to the second transport mechanism which transports the cards back to the stack or magazine, maintaining the cards in the same orientation and, incidentally but not necessarily, in the same order in which they have been removed. Such a stack may be vertically arranged and a suitable type of card knife provided at the bottom of the stack to knife the cards therefrom one at a time into the first transport mechanism. The cards being knifed from the bottom of the stack are read by a suitable reader disposed adjacent the bottom of the card stack and in a position in the path of movement of the card from the bottom of the stack into the first transport mechanism. Each of the cards will, of course, conventionally carry suitable indicia thereon identifying that particular card, in addition to the information at reduced scale which has been imprinted or otherwise suitably applied thereon. Instrumentalities may be provided in the form of a push-button station, for instance, setting up a particular configuration of electrical signals by operation of selected push-buttons to identify a particular card in the stack. Such an instrumentality may be part of an electrical circuit controlling a motor operating the card transport mechanisms and the knife for extracting the cards from the stack. The card knife and the transport mechanisms are operated by the existence of this signal and the search for the particular card continues until such time as the selected card is read by the card reader. At this point, the comparison of the interrogating signal entered into the system at the push-button station with each that is generated by the reader as the cards pass through, operates to stop the card so selected at a viewing point in a suitable optical system which is capable of projecting the image of the card at a sufficiently enlarged scale to permit visual observation of the contents thereon. Thus, the instrumentalities which operate to select a particular card are effective in controlling the card transport mechanisms, particularly the aforesaid first transport mechanism which may be stopped independently of the second, as will be described in greater detail hereinafter.

Additional features of such a card handling apparatus may include a provision for removing a card from the file so that it may be altered in any desired manner, and such a provision will therefore also include provisions for reinserting the card in the same position from which it was removed in some other desired position in the card stack, or, more likely, in any random position in the stack.

The aforesaid and other objects and advantages will be more apparent from a study of the following specifications when considered in conjunction with the accompanying drawings in which.

Figure 1:
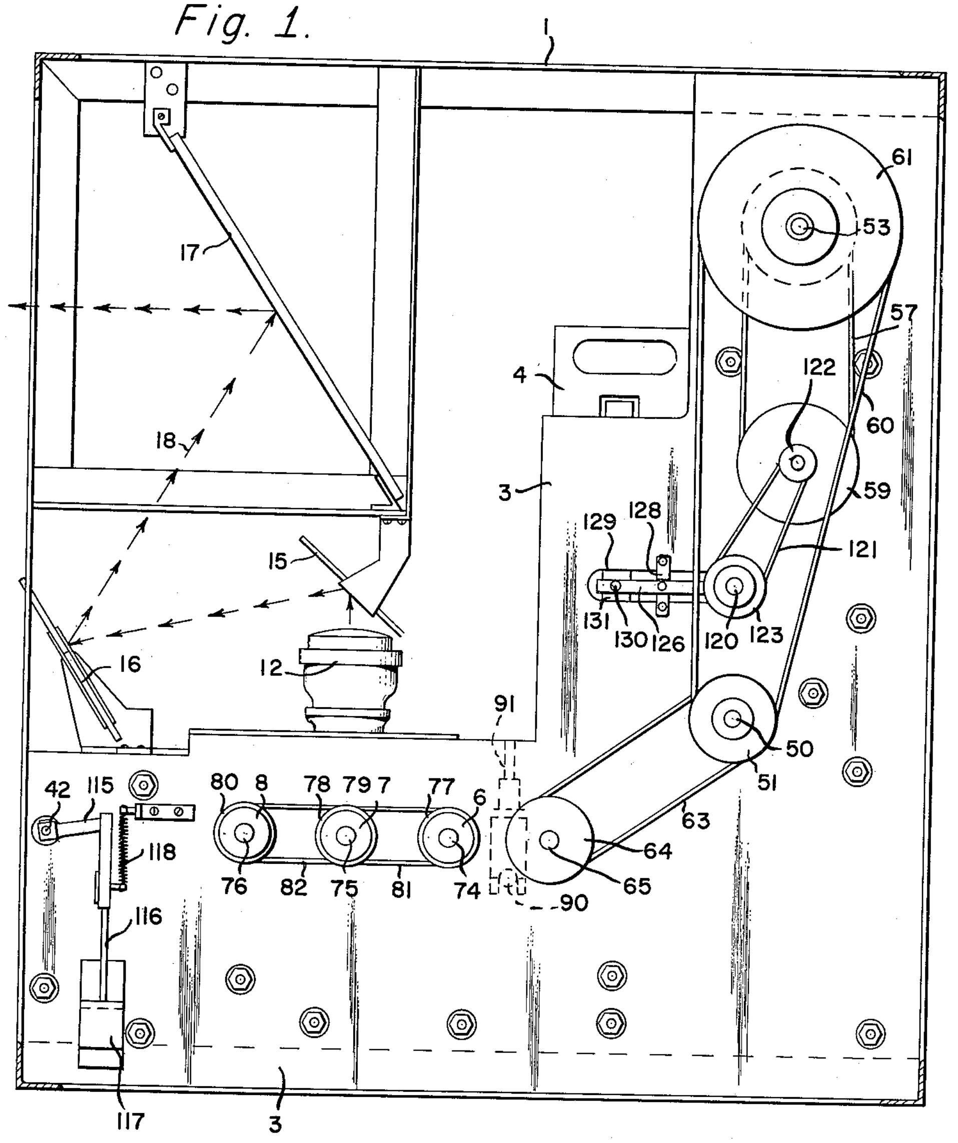
FIGURE 1 is a view, partially in section, of the right side of a card-handling apparatus embodying the principles of the invention.
Figure 5:
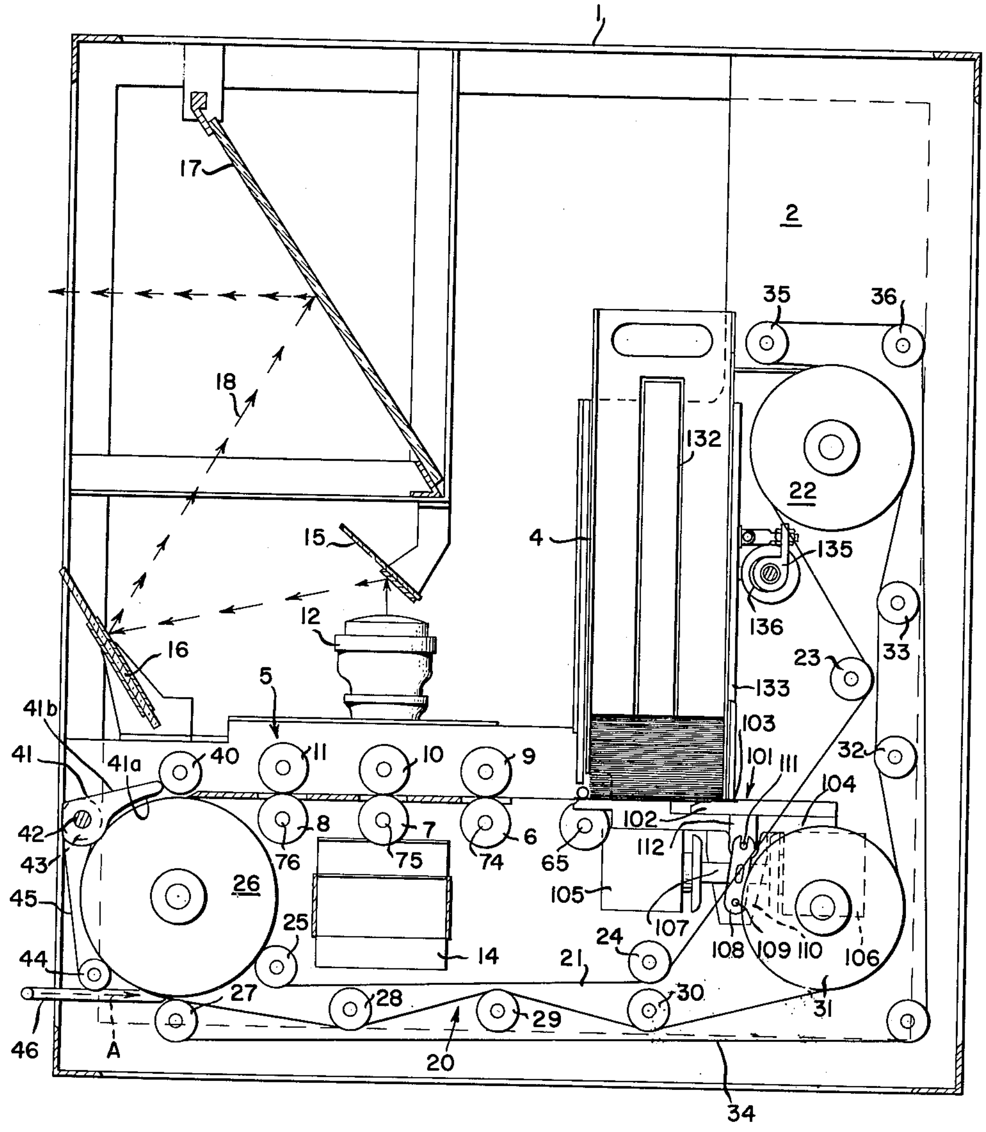
FIG. 5 is another view of the right side of the apparatus illustrated in FIG. 1 with a side plate removed to illustrate the card transport mechanisms and the card stack.

Referring to the drawings, the arrangement illustrated comprises a main frame, generally designated 1, having a pair of side plates 2 and 3 which carry the respective shafts, mounting pulleys and idler rolls forming part of the respective card transport mechanisms. A first transport mechanism, generally designated 5, is disposed to receive cards removed, as by knifing, from the bottom of an upright, a card stack or top loading magazine, generally designated 4, and is positioned on the left of the card magazine, as seen in FIG. 5. This first transport mechanism comprises a plurality of driven rolls 6, 7 and 8 operatively engaged with idler rolls 9, 10 and 11 disposed thereabove. Cards passing from the card magazine 4 are introduced between the respective pairs of driven and idler rolls and thus are transported from right to left, as viewed, past a card reader R and past a suitable lens system 12 forming part of a complete optical system including additionally a light source 13, a reflector 14 reflecting light vertically upwardly through the lens system 12, and respective reflecters 15 and 16, the latter of which reflects the image of a particular card onto a viewing plate, generally designated 17, which may be a frosted or etched surface as desired. Arrows 18, as seen in FIGS. 1 and 5 generally, indicate the passage of light through the optical system.

The transport system includes additionally a second transport mechanism comprising a system of belts, generally designated 20. This belt system comprises a first belt 21 which is entrained about a belt drive pulley 22 and engages idler pulleys 23 through 33. A second belt 34, which is opposed to the belt 21, has a portion engaging the belt drive pulley 22, being entrained about idler pulleys 27 through 33, and additionally passing about idler pulleys 35 and 36 which latter maintain belt 34 in contact with the belt drive pulley 22. By this expedient, the second belt 34 is maintained in contact with the first belt 21 so that cards may be carried between the belts from the bottom side of pulley 26 at the front of the unit up to and over the top of belt drive pulley 22, at which point the cards pass from between the belts to a position over the top of the top loading card stack or magazine 4 where they drop into position on top of the last card in the stack. The arrangement of the respective transport mechanisms is such that the card is returned to the top of the stack in precisely the same orientation it was in at the time it was removed from the bottom of the stack. Thus, while the combined action of the two drive mechanisms is effective to maintain the cards in a particular sequence or order, more importantly, this combined action maintains the orientation of the cards in the stack so that the cards may be ready for proper viewing at all times.

In the absence of a provision at the front of the unit at idler pulley 26 for removing the cards and for reinserting the cards, yet to be described, belt 34 may be extended up and around the front edge of the idler pulley 26 to a position entrained about an idler pulley 40 shown riding in contact with idler pulley 26. Hence, the cards passing to the left between drive roller 8 and idler roller 11 out of the first transport mechanism are picked up between the belts 21 and 34 and transported between the belts around the front of idler pulley 26 and thence back to the top of the stack.

In the arrangement illustrated, however, with particular reference to FIG. 5, provision is made for removing cards from the system. Such provision includes a card deflecter 41 which is secured to a shaft 42 at the front of the unit. As will be seen by referring to FIG. 2, for instance, a dual belt system is provided, that is, all of the pulleys thus far described, 22 through 36, have identical counterparts on the opposite side of the assembly providing identical drive systems inside the respective side plates 2 and 3. Thus, belt 21 and belt 34 and the pulley systems therefor, illustrated in FIG. 5 on the right side of the apparatus, are duplicated on the left side of the apparatus providing clear space therebetween and providing engagement of the cards at opposite edges as they are moved through the system. The same applies to drive rollers 6, 7 and 8 and idlers 9, 10 and 11 forming part of the first drive mechanism.

Figure 2:
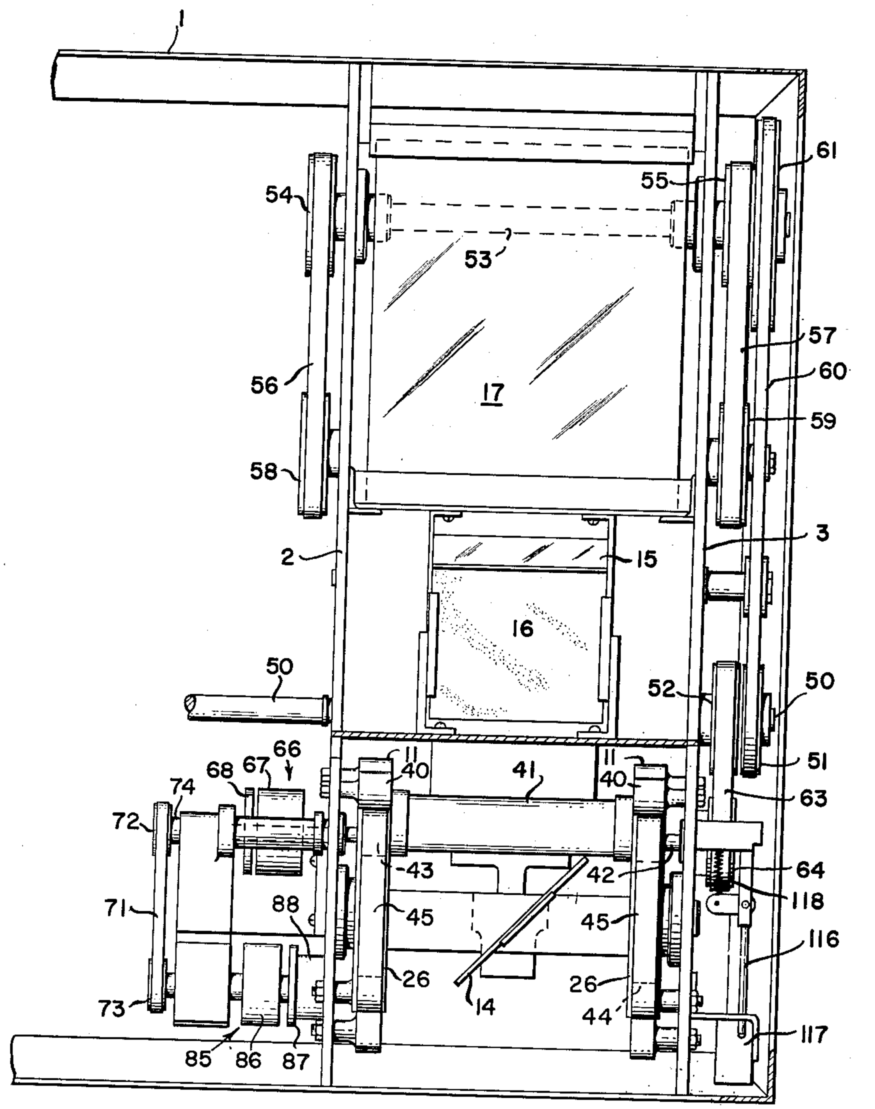
FIG. 2 is a front view of the apparatus illustrated in FIG. 1 with certain parts broken away for clarity.

Card deflecter 41, as will be seen by reference to FIG. 2, is situated between the respective idler pulleys 26, in which position a curved lower surface thereof, as viewed in FIG. 5 and designated 41*a*, may be positioned to approximately conform to the periphery of pulley 26, in which position cards emerging from the first drive mechanism pass beneath the surface 41*a* and are driven circumferentially with pulley 26 by the action of the pinch roll or idler 40. A short belt section 45 having a portion running on the surface of pulley 26 and entrained about respective pulleys 43 and 44 engages the leading edge of the card prior to the time the trailing edge of the card passes from beneath the pinch roll 40. Thus, continuity in card transport around the front of pulley 26 is assured. A short open section is provided between pulleys 44 and 27. The leading edge of a card emerging from the belt drive at pulley 44 impacts on the rotating edge of pulley 27 in such a position that rotation of this pulley and belt thereon lifts the leading edge of the card to a position between the belts at the bottom side of pulley 26 to complete the transport of the card from the first transport mechanism into the belt drive comprising belts 21 and 34. For the purpose of this description, belt 45 and deflecter 41 may be regarded as part of the second transport mechanism. By this expedient, cards are returned to the top of the card magazine or card stack 4.

If a card is to be removed from the system, the leading edge of the card deflecter adjacent pulley 40 is deflected downwardly, dropping to a position beneath the bottom edge of pinch roll 40, between the pulleys 26. Thus, a card passing to the left from the first transport mechanism passes over the top surface 41*b* of the card deflecter and out the front of the unit. The card may be returned to the system at any time and in any position, with reference to other cards, by inserting the card face down and leading edge first between the belts at the bottom of pulley 26 in the direction indicated by arrow A. Any type of card carrier, such as a tray or drawer 46, may be utilized to insert the card at this point, or the card may be inserted by hand.

Power for driving the card transport system, including the first and second transport mechanisms, is provided by means of a power shaft 50 which may be driven by any suitable motor means, such as an electric motor, not shown. Power shaft 50 is journaled in the side plates 2 and 3 of the assembly and projects through the side plate 3 on the right side of the unit, at which point two pulleys are mounted in coaxial positions at the end of the shaft. The first pulley, 51, is a V-belt pulley. The second pulley, 52, is adapted to receive a flat belt. Drive pulleys 22, which power the belt system for transporting cards, are powered from a jack shaft 53 which is journaled in side frames 2 and 3. At its opposite ends, externally of the side frames 2 and 3, jack shaft 53 mounts respective equal diameter pulleys 54 and 55 entraining respective flat belts 56 and 57 which drive respective pulleys 58 and 59 connected to the belt drive pulleys 22. Pulleys 58 and 59 are also of the same diameter. By this expedient, both drive pulleys 22, which are also equal in diameter, are driven at the same speed and the belts entrained thereabout therefore have the same surface speeds, which is important to prevent skewing of the cards. Power is applied to jack shaft 53 by a belt 60 connected between power shaft pulley 51 and a pulley 61 mounted on the end of jack shaft 53 on the right side of the unit.

Figure 3:
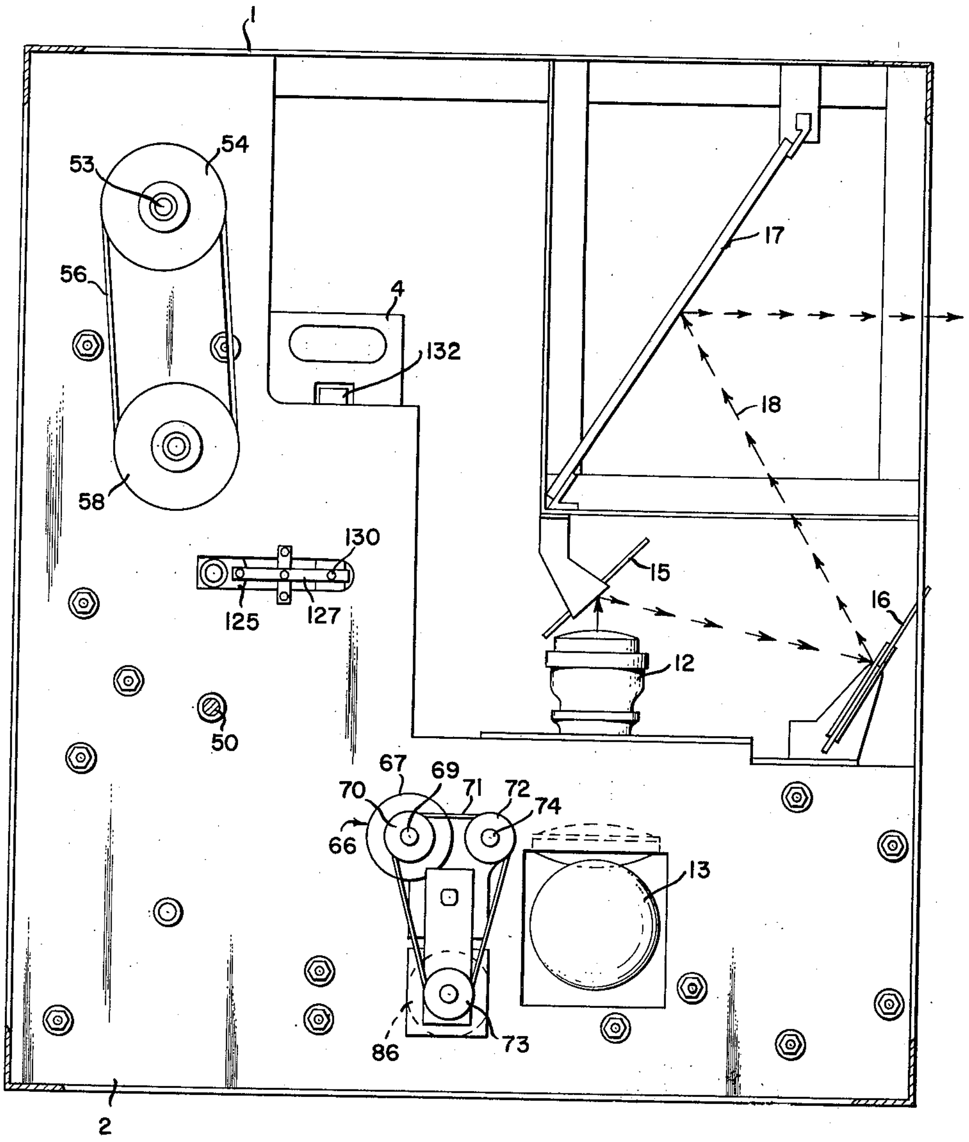
FIG. 3 is a view of the left side of the card-handling apparatus illustrated in FIG. 1.
Figure 4:
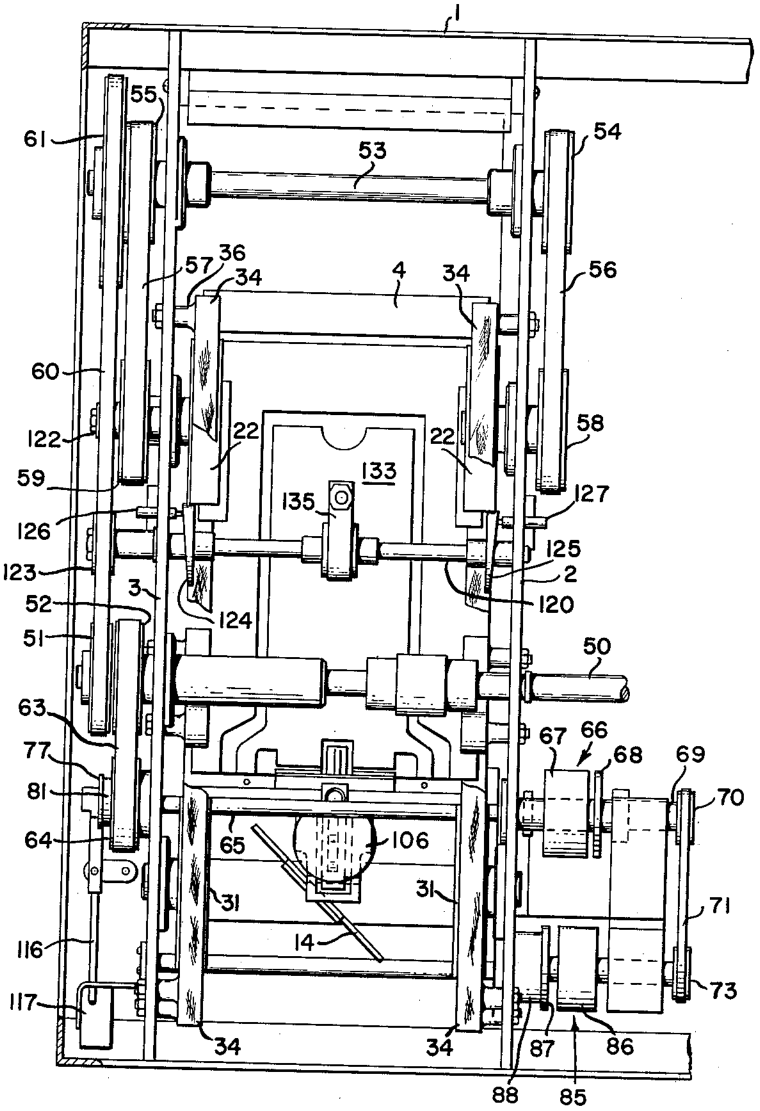
FIG. 4 is a view from the rear of the apparatus illustrated in FIG. 1. Here, also, certain parts have been broken away in the interest of clarity.

Pulley 52 provides a second power takeoff from the power shaft 50. Pulley 52 entrains a belt 63 engaging a pulley 64 which is mounted on a shaft 65 journaled in the side plates 2 and 3 and extending therethrough. As will be seen in FIG. 2, pulley 64 is mounted on the right side of the unit. Shaft 65 terminates in a clutch, generally designated 66, including an input member 67 and a clutch plate 68. This is a conventional type of electromagnetically operated clutch and the details are not shown in the interest of simplicity. Plate 68 may be splined upon an output shaft 69 terminating in a pulley 70 and may therefore be free to be axially displaced. Plate 68 may be spring loaded to the position shown and electromagnetically attracted to frictionally engage member 67 under the influence of a magnetic field produced by a coil, not shown, which may be located within clutch member 67. As will be seen by reference to FIG. 3, a belt 71 connects pulleys 72 and 73 with the pulley 70. Since pulley 70 is part of the power input system, any time that the clutch member 68 is energized and engaged the belt 71 will drive pulleys 72 and 73. Pulley 72 is mounted upon a shaft 74, also journaled between the side plates 2 and 3 and mounting drive roll 6. Drive roll shafts 7 and 8 are similarly mounted on shafts 75 and 76, all of which extend through the right side of the machine, that is, through side plate 3. Shaft 74 mounts a pulley 77. Shaft 75 mounts two axially disposed pulleys, one of which, 78, is aligned with pulley 77, and the other of which, 79, is aligned with a pulley 80 on shaft 76. A first belt 81 interconnects pulley 77 and pulley 78 to thereby drive the shaft 75. Shaft 76 is driven by means of a belt 82 connected between pulleys 79 and 80. The details of this arrangement are not illustrated in the interest of simplicity. The approximate location of the pulleys thus far described is evidenced in FIG. 4, illustrating the approximate position of pulley 77.

Pulley 73 is effectively an idler pulley which is normally freely rotatable but which may be coupled securely to the frame 2 by means of a brake 85 which in all respects may be the same as clutch 66 comprising a main brake member 86 for housing the coil (not shown) and a brake plate 87 which may be axially displaced from the position shown to engage a face of the main brake member 86. Plate 87 may be splined upon a suitable shaft or mounting 88 which is secured to frame 2 of the machine. By this expedient, plate 87 may not be rotated and when pulled into engagement with brake member 86 therefore frictionally brakes this member.

This portion of the drive system operates to control the first transport mechanism comprising the drive pulleys 6, 7 and 8. The input to this first transport mechanism, is will be recalled, is the power takeoff from shaft 50 through pulley 64 and shaft 65 which provides input power to the clutch 66. At any time that it is desired to stop the first transport mechanism, generally designated 5, it is only necessary to de-energize the clutch and energize the brake. The clutch is spring-released and opens immediately, thus disconnecting the input power. The brake is magnetically energized and promptly stops the first transport mechanism. The combined mechanical inertia of all of the members which are in rotation and which are still connected to the first transport mechanism after disengagement of the clutch is relatively low. Thus, the brake need not be a large brake and yet, by reason of the low inertia, is capable of rapily stopping the first transport mechanism whenever the brake is set.

Setting of the brake may be controlled by means of an electrical circuit responsive to an output signal indicating that a particular card has been found. As earlier explained herein, the cards may be read by means of a suitable card reader R. Photoelectric types of electric card readers are commonly used for this purpose, primarily because of their high speed reading capabilities. Such a card reader may comprise a light source, indicated generally in dotted outline, see FIG. 1, and designated 90, and a photocell or other photo detector assembly, generally designated 91. As illustrated, the light source is disposed beneath the plane defined by the upper surface of rolls 6, 7 and 8 and the photo detector assembly 91 is disposed immediately thereabove. If such a card is opaque and provided with suitably spaced perforations arranged in rows, light from the light source 90 may impinge upon selected photo detectors in the assembly 91. If a plastic film is employed for the card, transparent spots on an otherwise opaque film may permit the passage of light to the photo detector assembly. Here also perforations may be used if desired. Alternatively, the card may be transparent and opaque spots on the card used to control the photo detectors. Any suitable conventional type of card reader may be employed for the purpose here described.

Figure 6:
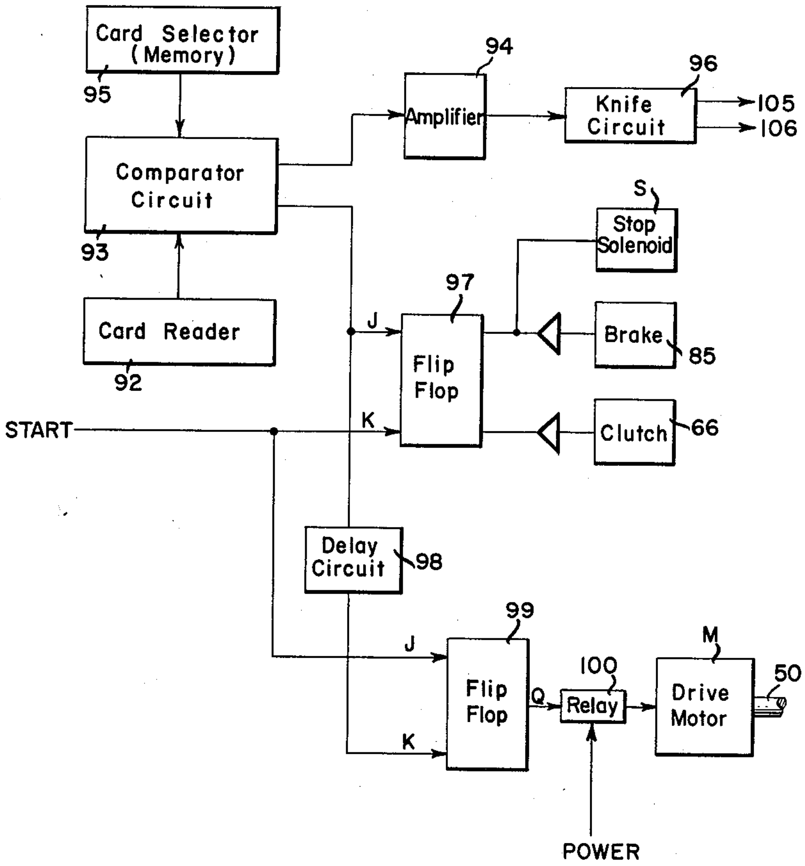
FIG. 6 is a block diagram of an electric circuit for controlling the apparatus.

As indicated in FIG. 6, the output of a conventional card reader circuit 92 which, of course, includes a detector such as 91 as an input element is applied to a conventional comparator circuit 93, along with the output of a card selector circuit 95 which may include a conventional register or a counter in turn controlled by a dial input, including the dial input from a dial telephone, or may be controlled by a push-button type of discrete signal input, or by any other suitable discrete signal-producing type of device usable in identifying a particular desired card in the card stack.

The comparator circuit includes two output circuits, one of which is identified as a noncoincidence output circuit, and the other of which is identified as a coincidence output circuit. Each time a card bearing the wrong identity flashes past the card reader an electrical signal is produced indicating noncoincidence. This signal is amplified by any suitable amplifier 94 the output of which is applied to and drives a knife circuit, generally designated 96. Knife circuit 96 may be a conventional trigger or multivibrator type of circuit conventionally having two electrical output connections. The respective output connections are indicated as being connected with an eject solenoid 105 and a retract solenoid 106 controlling a knife 101, yet to be described. This circuit will normally be so set that with the occurrence of each input pulse which controls the multivibrator rate, or trigger rate, an electrical output signal is produced which is applied to the eject solenoid 105 driving the knife in ejecting direction and ejecting a card into the first transport mechanism. Immediately thereafter the circuit resets de-energizing solenoid 105 and producing a second output signal applied to solenoid 106 energizing the retract solenoid and moving the knife to retracted position. By this expedient, each time an output signal is produced indicating noncoincidence of the card being read with the card desired, the solenoids are energized as described moving the card knife through a complete cycle and always leaving the knife in retracting position. Thus, at any time that a card being ejected is the desired card, the comparator circuit fails to produce a non-coincidence signal and the knife is cycled back to and remains in retracted position. With this arrangement, there is no overshoot as in conventional sinusoidal type of mechanical drives which are difficult to stop and usually result in unwanted cycling and ejection of one or two cards after the selected card has been found. This arrangement requires no braking features. The knife is merely left in the retracted position to which it is always moved by the knife circuit 96 when the desired card is found.

The coincidence output of the comparator circuit is applied to the J input terminal of a flip-flop 97. The dual outputs Q and $\overline{Q}$, respectively, are amplified in separate amplifiers and applied to the brake 85 and clutch 66 coil circuits, respectively. The coincidence output signal is also applied through a delay circuit 98 to the K input terminal of a flip flop 99. Flip flop 99 controls the coil circuit of a power relay 100 which switches electric power for the drive motor M which powers the power shaft 50 of the unit. Delay circuit 98 provides sufficient delay in stopping the drive motor so that the belt system, which at this time may carry one or more cards, will be operated through a period of time sufficient to deposit the last of the cards therein in the card stack 4.

A start circuit S has connections directly into the K input terminal of flip flop 97 and the J input terminal of flip flop 99. When power is applied to the start circuit it sets flip flop 97 into its $\overline{Q}$ electrical state. The amplified $\overline{Q}$ electrical output applied to clutch 66 engages the clutch and picks up the drive for the first transport mechanism. Flip flop 99 is set in its Q electrical state by the application of the start signal to its J input terminal which energizes power relay 100 and applies electric power to the drive motor M. By this expedient the card transport system, including the transport mechanism, generally designated 5, and the belt system, generally designated 20, is operated. The system continues to operate until coincidence is determined between the information being read from a card and that stored in the card selector circuit 95. The knife now stops in retracted position and the coincidence signal at the J input terminal of flip flop 97 switches the flip flop to its Q electrical state de-energizing clutch 66 and setting brake 85. After a brief delay, depending upon the time constant of circuit 98, the drive motor is also stopped. The timing is such that when brake 85 is set a card will normally be stopped almost exactly in reading position in the optical system beneath the lens system 12, for instance.

To insure precise stopping in viewing position beneath lens system 12, an additional control provided by a card stop solenoid S may be provided which is energized when flip flop 97 is in its Q electrical state, that is, this solenoid will be energized at the same time the brake 85 is energized. Such a control may operate stops, not shown, in the path of the card so that even though the first transport mechanism 5 may not be completely stopped at the instant the card is beneath the lens 12, card movement will be arrested with some slight slippage of drive roller 7 on the surface of the card. By this expedient, precise card positioning each time is achieved.

The cards may be removed from the bottom of the card stack or magazine 4 by any suitable means. The arrangement here shown is not illustrated in great detail since it involves a conventional knife, generally designated 101, having a leading edge 102 which is slightly depressed below the main surface of the knife to provide an edge 103 which is approximately the thickness of a card and which confronts the rear edge, or trailing edge, of a card, as viewed, in a position slightly displaced therefrom when fully retracted. The knife is shown in its retracted position, in which position the leading edge underlies the rear edge of the stack of cards. At no time does this leading edge move from beneath the card stack. Thus, the edge 103, so long as there is card pressure on the upper face of the knife, always properly confronts the rear edge of a card. Knife 101 is mounted upon a suitable knife carrier 104 which forms a rigid part of the machine assembly and is fixed relative to, and in fact may support, the card magazine 4. Knife 101 is driven by the pair of solenoids 105 and 106 which are alternately energized, as described in connection with FIG. 6, providing an energizing frequency corresponding to that desired, but which is yet below the upper frequency range at which operation becomes uncertain due to high accelerations. The plungers of these solenoids are connected to a common shaft 107. A link 108, pivoted at 109 on a depending frame section 110 of the knife carrier, is slotted substantially centrally to receive a cooperating pin on plunger shaft 107. The upper end of link 108 is slotted and receives a pin 111 carried on a depending bracket 112 on the knife. As the solenoid shaft 107 moves between its left and right extremes, depending upon energization of respective solenoids 105 and 106, knife 101 is propelled between its two positions, advancing to the left as viewed with energization of eject solenoid 105, to displace the bottom card from the card stack or magazine into the first transport mechanism, that is, between rollers 6 and 9. During this interval, of course, the card passes through the card reader station and is read. The card continues to advance through the first transport mechanism unless it is the card to be viewed, in which case it is stopped, as described hereinabove.

As earlier described herein, provision is made for removing cards from the system. If it is desired to make a change in a card, the system may be interrogated, as described in connection with FIG. 6, to select a particular card. However, in this situation, instead of reading the card it is desired to remove the card from the system. This may be done in several ways. The card may be stopped, as provided by the arrangement of FIG. 6, in viewing position in the optical system, after which card deflector 41 may be operated to depress its leading edge so that the card may be prevented from being transported about the front edge of pulley 26 and back to the stack via the belt system 21, 34. In a more sophisticated arrangement the system may be set up to simply deflect the card deflector when it is desired to remove a card from the stack, rather than stop a card, in which case the card will move right through and be ejected. These and other obvious expedients may be employed as desired. For present purposes it may be assumed that the card is stopped, the deflector then set to eject the card, and thereafter this system started by any suitable manual or electrical means so that the card may be ejected.

The card deflector 41 is operated by means of a link system which is spring-loaded to maintain the card deflector in the position illustrated, for instance, in FIG. 5, to permit circulation of the cards in the transport system. To this end, the shaft 42 extends through side plate 3, as seen in FIG. 1, and carries a crank arm 115 which is connected to a power link 116 which may be electromagnetically, mechanically or hydraulically operated by an instrumentality 117 which, for present purposes, may be assumed to be a solenoid which exerts a downward pull on the rod or link 116 against the loading provided by spring 118. When it is desired to remove a card from the system, with reference to FIG. 6, the card identification may be inserted by means of instrumentality 96. When a card is found it will be stopped in position beneath the optical system. At this time an additional electrical switch or control, not shown, may be actuated to energize the solenoid 117 and deflect the leading edge of the card deflector 41. The system may now be started by a suitable control, not shown, over-riding the circuit of FIG. 6 just sufficiently to eject the desired card. Any changes may be made to the card, or the card completely replaced, as desired, which is one of the marked advantages offered by the individual information carrier type of arrangement as compared to the continuous strip type, such as a film strip, of other devices.

In still another arrangement, linke 116 may constitute part of a key controlled mechanical interlock between drawer 46 and card deflector 41, whence cards may be removed only if a key is available. The details of such a linkage may be conventional and are not illustrated.

The key would operate the linkage 116 to depress card deflector 41 and release drawer 46. After the card is examined or altered, it is replaced in the drawer. When the drawer is returned the belt system pulls the card from the drawer. Return of the drawer may also restore deflector 41 to the position shown.

In an arrangement of this type, it is essential that the cards be maintained in fairly good physical condition, that is, a card should not be wrinkled, folded or damaged marginally which would interfere with their proper feeding in the stack or prevent proper engagement by the knife. Normal handling of the cards in the respective transport mechanisms and normal handling of the cards by the card knife will not damage the cards to any extent; thus, the life expectancy of the card is considerable.

As an aid to maintaining the cards in proper position in the card magazine or card stack, an arrangement referred to as a tamper is provided which engages the card stack on three sides and functions effectively as a vibrator to settle the cards in the stack. This assembly comprises the input shaft, generally designated 120, which is driven by means of a belt 121 connected between pulleys 122 and 123, the latter of which is mounted upon the shaft 120. Pulley 122 is mounted on the shaft mounting pulley 59 driving one of the tape pulleys 22. Shaft 120 mounts a pair of cams, or wobble plates, 124 and 125 in positions on opposite sides of card magazine 4. These cam plates 124 and 125, respectively, actuate respective levers 126 and 127 pivoted on the outer sides of the plates 2 and 3. Plates 2 and 3 are slotted, as indicated at 129 in FIG. 1, and connections 130, as seen in FIG. 1, extending through these slots engage tamper bars 131 and 132 disposed in slots in opposite sides of card magazine 4. As cams 124 and 125 rotate, it will be seen that arms 126 and 127 are pivoted about their fixed pivots, as shown at 128, and thus displace respective bars 131 and 132 towards each other to tap the opposite ends of the card stack and thereby align these edges throughout the height of the card stack. As will be seen to the right of FIG. 5, the leading edges of the cards are disposed adjacent to or in contact with the front plate of the card magazine. A movable tamper plate 133 is disposed in an opening in the back plate of the card magazine, see FIGS. 4 and 5. This plate 133 is connected to a suitable actuator 135 rotatably mounted on an eccentric 136 on shaft 120. By this expedient, plate 133 is caused to vibrate against the trailing edge of the cards, that is, the back edge of the cards, in the stack, as seen in FIG. 5 and also FIG. 4. Thus, this tamper arrangement, which engages the cards on opposite edges and which engages the trailing edge of the cards, imparting vibratory impact throughout in some slight degree required to agitate the cards and align them in the stack, maintains the cards in proper position as they move downwardly in the stack with removal of cards from the bottom, to thereby properly present the cards to the knife at all times.

It will be apparent from the foregoing considerations that an arrangement has been herein provided which reliably displaces cards from a card stack, circulates the cards through reading and viewing stations, selectively stopping the cards or ejecting the cards, or returning the cards to the stack in proper order and in proper position. Although but one embodiment of this invention is described, it will be appreciated by those skilled in the art that many detailed changes may be made in the arrangements disclosed without departing from the spirit and scope of the invention. For instance, as a matter of convenience the card magazine is arranged so that the cards are stacked vertically, whence gravity bias may keep the stack intact. In some arrangements it may be desirable to incline the stack rather than maintain the stack in a vertical position, or the stack may be disposed horizontally and a pressure plate provided to maintain the necessary card pressure at the knife. Each returning card is then slipped between the pressure plate and next adjacent card.

These and other equally obvious changes may be made by those skilled in the art. It is therefore intended that the foregoing disclosure and the showings made in the drawings shall be considered only as illustrative of the principles of this invention and not construed in a limiting sense.

What is claimed is:

1. Apparatus for removing individual information carriers from the bottom of a stack of individual information carriers and returning them to the top, comprising: a first transport mechanism including means for gripping and moving an information carrier; upright information carrier storage means having a bottom end adjacent said first transport mechanism; a cyclic mechanism at the bottom of said storage means for removing information carriers one at a time from the bottom of said storage means and inserting each information carrier at said first transport mechanism; a second transport mechanism, including means for gripping and moving an information carrier throughout its length, having a first end disposed to receive information carriers from said first transport mechanism and having a terminal end adjacent the top of said storage means for returning information carriers thereto; and a card deflector disposed between said first and second transport mechanisms and operable from a first position permitting entry of information carriers into said second transport mechanism to a second position preventing entry of information carriers into said second transport mechanism.

2. Apparatus for removing individual information carriers from the bottom of a stack of individual information carriers and returning them to the top, comprising: a first transport mechanism including means for gripping and moving information carriers; a top loaded information carrier storage means having a bottom end adjacent said first transport mechanism; a cyclic mechanism for removing information carriers one at a time from the bottom of said storage means and inserting each information carrier at said first transport mechanism; a second transport mechanism, including means for gripping and moving information carriers throughout its length, having a first end disposed to receive information carriers from said first transport mechanism and having a terminal end adjacent the top end of said storage means for returning information carriers thereto; and means controlling said first transport mechanism independently of said second transport mechanism.

3. Apparatus for removing individual information carriers from the bottom of a stack of individual information carriers and returning them to the top, comprising: a first transport mechanism including means for gripping and moving information carriers; upright information carrier storage means having a bottom end adjacent said first transport mechanism; a cyclic mechanism for removing information carriers one at a time from said storage means and inserting each information carrier at said first transport mechanism; a second transport mechanism, including means for gripping and moving information carriers throughout its length, having a first end disposed to receive information carriers from said first transport mechanism and having a terminal end adjacent the top end of said storage means for returning information carriers thereto; power means connected to and driving said second transport mechanism; and control means connecting said first transport mechanism to said power means and controlling starting and stopping thereof.

4. Apparatus for removing individual information carriers from the bottom of a stack of individual information carriers and returning them to the top, comprising: a first transport mechanism including means for gripping and moving individual information carriers; a top loaded information carrier storage means having a bottom end adjacent said first transport mechanism; a cyclic mechanism for removing information carriers one at a time from the bottom of said storage means and inserting each information carrier at said first transport mechanism; a second transport mechanism, including means for gripping and moving individual information carriers throughout its length, having a first end disposed to receive information carriers from said first transport mechanism and having a terminal end adjacent the top of said storage means for returning information carriers thereto; power means connected to said second transport mechanism to drive said second transport mechanism; control means connecting said first transport mechanism to said power means and controlling starting and stopping thereof; and circuit means connected to and controlling said control means and said cyclic mechanism to start and stop together said first transport mechanism and said cyclic mechanism.

5. Apparatus for removing individual information carriers from the bottom of a stack of individual information carriers and returning them to the top, comprising: a first transport mechanism including means for gripping and moving individual information carriers; a top loaded information carrier storage means having a bottom end adjacent said first transport mechanism; a cyclic mechanism for removing information carriers one at a time from the bottom of said storage means and inserting each information carrier at said first transport mechanism; a second transport mechanism, including means for gripping and moving individual information carriers along the length thereof, having a first end disposed to receive information carriers from said first transport mechanism and having a terminal end adjacent the top of said storage means for returning information carriers thereto; power means connected to and driving both of said first and second transport mechanisms; input circuit means producing electrical signals indicative of a desired information carrier; information carrier reader circuit means producing electrical signals indicative of respective information carriers in said first transport mechanism; comparator means coupled to and energized by said input circuit means and said reader circuit means comparing said first mentioned and second mentioned electrical signals; and circuit means controlled by said comparator means when said electrical signals are the same and connected to and controlling said first transport mechanism and said cyclic mechanism to stop said information carriers.

6. Card handling apparatus, comprising: a transport mechanism having an input end and an output end; a top loaded card magazine having a bottom card removal end adjacent said input end of said transport mechanism and having an upper card return end; means for removing cards from the bottom end of said card magazine and inserting cards at said input end of said transport mechanism; a belt system, including means for gripping cards throughout the length thereof, having an input end adjacent said output end of said transport mechanism and having an output end adjacent said upper end of said card magazine for receiving cards from said transport mechanism and returning cards to said upper end of said magazine; and means for controlling said transport mechanism independently of said belt system.

7. Card handling apparatus, comprising: a transport mechanism having an input end and an output end; an upright card magazine having a bottom card removal end adjacent said input end of said transport mechanism and having an upper card return end; means for removing cards from the bottom end of said card magazine and inserting cards at said input end of said transport mechanism; a belt system, including means for gripping cards throughout the length thereof, having an input end adjacent said output end of said transport mechanism and having an output end adjacent said upper end of said card magazine for receiving cards from said transport mechanism and returning cards to said upper end of said magazine; a movable card deflector at said output end of said first transport mechanism operable in a first position for deflecting cards emerging from said first transport mechanism away from said input end of said belt system and operable in a second position to deflect cards into said input end of said belt system; and means for controlling said transport mechanism independently of said belt system.

8. Card handling apparatus, comprising: a transport mechanism having an input end and an output end; a top loaded card magazine having a bottom card removal end adjacent said input end of said transport mechanism and having an upper card return end; a card knife for knifing cards from said bottom end of said card magazine; means cyclically operating said card knife to knife a single card at a time from said bottom end of said card magazine and insert cards individually at the input end of said transport mechanism; a belt system, including means for gripping cards throughout the length thereof, having an input end adjacent said output end of said transport mechanism and having an output end adjacent said upper end of said card magazine for receiving cards from said transport mechanism and returning cards to said upper end of said magazine; and means for controlling said transport mechanism independently of said belt system.

9. Card handling apparatus, comprising: a transport mechanism having an input end and an output end; a top loaded card magazine having a bottom card removal end adjacent said input end of said transport mechanism and having an upper card return end; a card knife for knifing cards from said bottom end of said card magazine; means cyclically operating said card knife to knife a single card at a time from said bottom end of said card magazine and insert cards individually at the input end of said transport mechanism; a belt system, including means for gripping cards throughout the length thereof, having an input end adjacent said output end of said transport mechanism and having an output end adjacent said upper end of said card magazine for receiving cards from said transport mechanism and returning cards to said upper end of said magazine; a movable card deflector at said output end of said first transport mechanism operable from a first position permitting entry of cards at said input end of said belt system to a second position preventing cards from entering said input end of said belt system; and means for controlling said transport mechanism independently of said belt system.

10. Card handling apparatus, comprising: a transport mechanism having an input end and an output end; a top loaded card magazine having a bottom card removal end adjacent said input end of said transport mechanism and having an upper card return end; means for removing cards at said bottom end of said card magazine and inserting cards at said input end of said transport mechanism; a belt system, including means for gripping cards throughout the length thereof, having an input end adjacent said output end of said transport mechanism and having an output end adjacent said upper end of said card magazine for receiving cards from said transport mechanism and returning cards to said upper end of said magazine; power means connected to said belt system to drive said belt system; clutch means connected between said power means and said transport mechanism; and means for engaging and disengaging said clutch means.

11. Card handling apparatus, comprising: a transport mechanism having an input end and an output end; a top loaded card magazine having a bottom card removal end adjacent said input end of said transport mechanism and having an upper card return end; means for removing cards at said bottom end of said card magazine and inserting cards at said input end of said transport mechanism; a belt system, including opposed engaging belts, having an input end for receiving cards between said belts adjacent said output end of said transport mechanism and having an output end for ejecting cards from between card belts adjacent said upper end of said card magazine for receiving and gripping cards from said transport mechanism and returning cards to said upper end of said magazine; power means connected to said belt system to drive said belt system; clutch means connected between said power means and said transport mechanism; circuit means producing electrical signals identifying a particular card; card reader means producing electrical signals indicative of particular cards in said transport mechanism; comparator means coupled to said circuit means and said card reader means and responsive to said electrical signals; control means connected to and controlled by said comparator means and connected to and de-energizing said means for removing cards and said clutch means when said electrical signals are the same.

12. Card handling apparatus, comprising: a transport mechanism having an input end and an output end; a top loaded card magazine having a bottom card removal end adjacent said input end of said transport mechanism and having an upper card return end; a card removing knife at said card removal end of said stack and operable between retracted and card ejecting positions; respective solenoids connected with said knife for displacing said knife between retracted and ejecting positions; a belt system, including opposed engaging belts, having an input end for receiving cards between said belts, disposed adjacent said output end of said transport mechanism and having an output end for ejecting cards from between said belts adjacent said upper end of said magazine to thereby move cards from said transport mechanism and eject them into the upper end of said magazine; power means connected to said belt system to drive said belt system; clutch means connected between said power means and said transport mechanism; circuit means producing electrical signals identifying a particular card; card reader means producing electrical signals indicative of cards in said transport mechanism; comparator means coupled to said circuit means and said reader means and responsive to said electrical signals; and control means connected to and controlled by said comparator means and connected to and de-energizing said clutch means and said solenoids when said electrical signals are the same.

References Cited in the file of this patent

UNITED STATES PATENTS

| | | |
|---|---|---|
| 2,223,334 | Robinson | Nov. 16, 1940 |
| 2,257,220 | Becker | Sept. 30, 1941 |
| 2,522,226 | Hood | Sept. 12, 1950 |
| 2,692,774 | Sidman | Oct. 26, 1954 |
| 2,795,328 | Tyler et al. | June 11, 1957 |